United States Patent [19]

Van Assche

[11] 3,959,332
[45] May 25, 1976

[54] WATER SOLUBLE NITRO COMPOUNDS

[75] Inventor: Daniel Van Assche, Binningen, Switzerland

[73] Assignee: Sandoz Ltd., Basel, Switzerland

[22] Filed: Apr. 6, 1971

[21] Appl. No.: 131,826

[30] Foreign Application Priority Data

May 4, 1970 Switzerland............... 6647/70

[52] U.S. Cl. ............... 260/456 A; 8/54; 8/173; 8/178 R; 260/288 R; 260/294.8 F
[51] Int. Cl.² ............ C07C 143/55; C07C 143/68
[58] Field of Search ........................ 260/456 A

[56] References Cited
OTHER PUBLICATIONS

Roberts and Caserio, "Basic Principles of Organic Chemistry," p. 844 (1964).

Primary Examiner—Alton D. Rollins
Assistant Examiner—David B. Springer
Attorney, Agent, or Firm—Gerald D. Sharkin; Richard E. Vila; Thomas C. Doyle

[57] ABSTRACT

Water-soluble nitro compounds of the formula

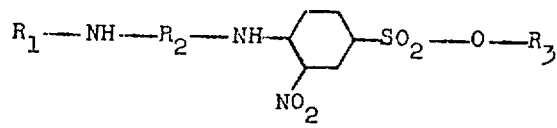

(I), where $R_1$ and $R_2$, independently of each other, represent aromatic or heterocyclic radicals which may be substituted, $R_3$ an aromatic or heterocyclic radical which may be substituted, and the molecule bears 1 or 2 sulphonic acid groups are valuable dyes especially for synthetic polyamide fibers.

16 Claims, No Drawings

WATER SOLUBLE NITRO COMPOUNDS

This invention relates to water soluble nitro compounds of the formula

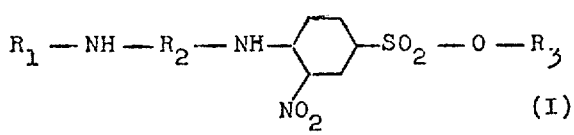

where $R_1$ and $R_2$, independently of each other, represent carbocyclic or heterocyclic aromatic radicals which may be substituted, $R_3$ a carbocyclic or heterocyclic aromatic radical which may be substituted, and the molecule bears 1 or 2 sulphonic acid groups.

These compounds are obtained by reacting 1 mole of a compound of the formula

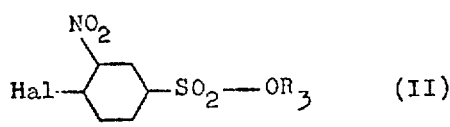

where Hal represents chlorine, bromine or fluorine, with 1 mole of an amino compound of the formula

The radicals $R_1$ and $R_2$ may be, for example, carbocyclic aromatic radicals of the naphthalene or, preferably, the benzene series and may bear substituents such as lower alkyl or alkoxy groups (methyl, ethyl, iso-propyl, n-butyl, tert.butyl, n-amyl, tert.amyl, methoxy, ethoxy), halogen atoms (chlorine, bromine, fluorine), nitro, cyano or trifluoromethyl groups, acylamino groups, alkanoylamino groups, preferably lower (formyl, propionyl, butyryl and in particular acetylamino), alkoxycarbonylamino groups (methoxycarbonyl and ethoxycarbonylamino), substituted or unsubstituted benzoylamino groups (benzoyl, 2- and 4-chlorobenzoyl, 4-methylbenzoylamino) and benzenesulphonylamino groups (benzenesulphonylamino, 4-methylbenzenesulphonylamino), substituted or unsubstituted sulphonamide groups ($SO_2NH_2$, $—SO_2—NH—CH_3$, $—SO_2—NH—C_2H_4—OH$, $—SO_2—N(CH_3)_2$, $—SO_2—NH—C_3H_6—O—CH_3$), lower alkylsulphonyl groups ($—SO_2CH_3$, $—SO_2—C_2H_5$), a sulphonic acid group or a heterocyclic radical, such as a benzothiazolyl radical.

The radicals of thiazole, benzothiazole and pyridine are illustrative of heterocyclic aromatic radicals.

The preferred compounds of formula (III) include 4-amino-1,1'-diphenylamino-3-sulphonic acid, 4-amino-2-methoxy- and 4-amino-2-ethoxy-1,1'-diphenylamino-2'-, -3'- and -4'-sulphonic acid, 4-amino-4'-acetylamino-1,1'-diphenylamino-2-sulphonic acid, 4-amino-2'-, -3'- and -4'-chloro-1,1'-diphenylamino-2-sulphonic acid, 4-amino-2'-, -3'- and -4'-methoxy- and -ethoxy-1,1'-diphenylamino-2-sulphonic acid, 4-amino-2'-nitro-1,1'-diphenylamino-4'-sulphonic acid, 4-amino-1,1'-diphenylamino-2'-, -3'- and -4'-sulphonic acid, 1-amino-4-(naphthyl-1'-amino)-benzene-3-sulphonic acid, 4-amino-4'-phenoxy-1,1'-diphenylamino-2-sulphonic acid, 4-amino-4'-(4''-chlorophenoxy)-1,1'-diphenylamino-2-sulphonic acid.

The radical $OR_3$ may be derived from a hydroxyaryl compound, such as hydroxybenzene, 1-hydroxy-2-, -3- and -4-methyl-, -ethyl-, -methoxy- or -ethoxybenzene, 1-hydroxy-2-, -3- and -4-bromo-, -chloro- or -fluoro-benzene, 1-hydroxy-2,4- and -2,5-dichloro- and -2,4,5- or -2,4,6-trichloro- or -tribromobenzene, 1-hydroxy-2,4-, -2,5-, -2,6- and -3,4-dimethyl- or -diethylbenzene, -2,4,6- and -2,4,5-trimethylbenzene, 1-hydroxy-2-ethyl-4,6-dimethyl- or -2,4-diethyl-6-methylbenzene, 1-hydroxy-4-iso-propyl-, -4-n-butyl-, -4-tert.butyl-, -4-tert.amyl-, -4-tert.octyl-, -4-iso-octyl-, -4-nonyl-, or -4-dodecyl benzene, 1-hydroxy-4-n-butoxy-, -4-n-amyloxy-, -4-phenoxy-, -4-benzyloxy-, -4-cyclohexyloxy-, -4-phenyl-, -4-cyclohexylbenzene, 1-hydroxy-2,3- or -3,4-tetramethylenebenzene, 1-hydroxy-2-iso-propyl-5-methylbenzene, 1-hydroxy-2-methyl-5-isopropylbenzene, 1-hydroxy-2-, -3- or -4-carboxybenzene, 1-hydroxy-2-, -3- or - 4-sulphobenzene, 1-hydroxy-3- or -4-acetylamino-, -propionylamino-, -butyrylamino-, -benzoylamino-, -methoxycarbonylamino-, -ethoxycarbonylamino-, -phenylsulphonylamino-, -4'-methylphenylsulphonylaminobenzene, 1-hydroxy-3- or -4-nitro-, methylsulphonyl-, -ethylsulphonyl- or -cyanobenzene, 1- or 2-hydroxynaphthalene, 1-hydroxy-4-methoxy- or -4-ethoxynaphthalene, 1-hydroxy-4-, -5-, -6- or -7-sulphonaphthalene, 2-hydroxy-4- or -6-sulphonaphthalene, 2-hydroxy-4- or -6-sulphonaphthalene, or from a hydroxylated heterocyclic aromatic compound such as 3- or 4-hydroxypyridine, 3-, 4-, 5-, 6-, 7- or 8-hydroxyquinoline.

Alternatively, the radical $R_3$ may be derived from a compound whose hydroxyl group is bound to a nitrogen atom, such as 5-norbornen-endo-2,3-dicarboxylic hydroxylimide.

The compounds of formula (II) can be produced, for example, by reacting sulphonic acid chlorides of the formula

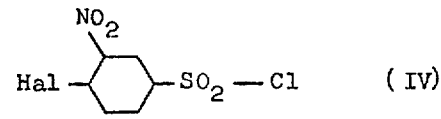

with hydroxy compounds of the formula $R_3$—OH in an aqueous, aqueous-organic or organic medium, preferably at temperatures in the range of 50°–100°C and in the pH region of 7 to 12.

The reaction of the compounds of formula (II) with the amino compounds of formula (III) can be carried out in an aqueous, aqueous-organic or organic medium at temperatures in the range of 0°–200°C (in dependence on the reactivity of the halogen atom in the reaction medium).

Suitable organic solvents are those which react with the reactants only under conditions more energetic than those employed for the reaction of the compounds of formulae (II) and (III); examples of such solvents are alcohols, such as ethanol, isopropanol, n-butanol, benzyl alcohol, dimethoxy- and 1,2-diethoxyethane and -propane, di-iso-propylether, di-n-butylether, methoxybenzene, ethoxybenzene; alcohol ethers, such as 2-methoxy-, 2-ethoxy- and 2-n-butoxyethanol, 2-methoxy- and 2-ethoxypropanol-1, 2-(2'-methoxy-, 2-(2'-ethoxy- or 2-(2'-n-butoxyethoxy)-ethanol; ketones, such as acetone, methyl ethyl ketone, methyl iso-butyl ketone; amides, such as dimethyl formamide, dimethyl acetamide, hexamethylphosphoric triamide; sulphoxides, such as dimethyl sulphoxide; sulphones such as tetramethylene sulphone.

If an aqueous medium is chosen for the reaction, the amino compound of formula (III) is dissolved in water, if necessary with the addition of an emulsifying or dispersing agent, and the solution added in small portions with thorough stirring to the compound of formula (II) so that it is finely distributed as rapidly as possible without a local exothermic reaction taking place. It is best to choose temperatures ranging from 0°C to 140°C, optimally from 80°C to 130°C, and a pH value in the region of 3 to 12 or more especially 5 to 9. The reaction is carried out in a pressure vessel if the temperature is higher than 100°C. The acid-binding agent may be an acetate, carbonate, bicarbonate or hydroxide of an alkali metal or an alkaline-earth metal or magnesium oxide. The acetates, the water insoluble carbonates and/or the hydroxides and magnesium oxide can be added at the commencement of the reaction or during its course, whereas the water insoluble carbonates, bicarbonates and hydroxides are best added in portions during the reaction.

The reaction can be conducted in the same manner in an aqueous-organic as in a purely aqueous medium. It is advisable to dissolve the amino compound of formula (III) in water, adding if necessary an emulsifying or dispersing agent, and to add to the solution the compound of formula (II) in the form of a solution in an organic solvent, with thorough stirring.

Further, it is possible to dissolve the amino compound of formula (III) in an aqueous-organic medium, e.g. a water-alcohol mixture, with the subsequent addition of a dispersing or emulsifying agent if necessary, and to add the compound of formula (II) in solid, finely pulverized form or in solution in an organic solvent. It is preferable to use water in a substantial excess relative to the amount of organic solvent or solvents employed. The same acid-binding agents as for a purely aqueous reaction medium can be used to maintain a constant pH value.

For reacting in organic medium, it is best to select a solvent or solvent mixture which dissolves both reactants. Examples of very suitable solvents are amides, such as dimethyl formamide and acetamide, glycols and polyglycols. If dimethyl formamide or ethylene glycol is chosen, temperatures in the range of 20°C to 150°C are employed, and one of the aforenamed acid-binding agents, preferably magnesium oxide, is included in the reaction medium.

On completion of the reaction the dye formed is precipitated from its aqueous solution or suspension by the addition of a salt or acid, filtered with suction, washed with a salt solution if necessary, and finally dried. If the dye is present in an aqueous-organic or organic medium the organic solvent can be distilled first, e.g. with steam or under normal or reduced pressure, or the entire reaction mixture can be run into an ample volume of water and the dye isolated from this.

The new dyes of formula (I) are used for the exhaust dyeing, pad dyeing and printing of animal fibres, such as wool and silk, of leather, of synthetic polyurethane fibres, e.g. from 1,4-butandiol and hexamethylene di-iso-cyanate, and in particular of synthetic polyamide fibres, e.g. the polyamides 6, 6.6, 6.10, 6.11 and 6-6.6. These fibres may be present in blends with each other or with other fibres.

The commonly used wetting, levelling and thickening agents and other textile and leather auxiliaries can be employed for the exhaust or pad dyeing and printing of the dyes of formula (I).

On the aforementioned substrates the dyes show good power of build-up and good levelling properties. They can be dyed from an acid to neutral medium at temperatures from 70° to 100°C, preferably at the boil.

Dyeings and prints are obtained which have good light fastness and very good wet fastness, such as washing, milling, water, sea water and perspiration fastness, together with good rubbing and dry cleaning fastness.

Compounds analogous to those of formula (I) are disclosed in Belgian Pat. No. 739,620, issued Sept. 30, 1969, in which however an

occurs in place of an —OR$_3$ group. The said patent states that R$_5$ stands for a hydrogen atom or an optionally substituted alkyl or aryl radical and R$_6$ for an aromatic radical bearing at least one non-ionic substituent or for a heterocyclic radical which may be substituted.

In relation to the compounds of Belgian Pat. No. 739,620 the dyes of the present invention possess important merits, notably higher neutral affinity, better wet fastness properties and greater suitability for combination dyeing with widely used commercial dyes, namely among them the rubine dye of the formula

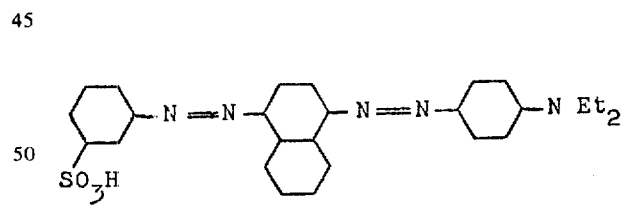

the blue dye of the formula

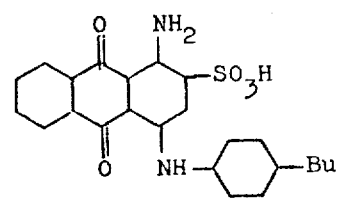

and the greenish blue dye of the formula

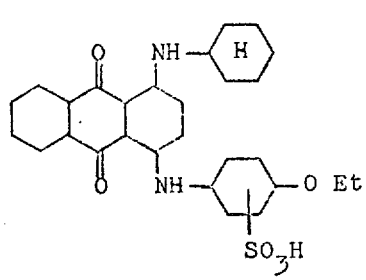

In the following Examples the parts and percentages are by weight and the temperatures in degrees centigrade.

EXAMPLE 1

A mixture of 39.6 parts of 1-chloro-2-nitrobenzene-4-sulphonic acid-(4'-cyclohexyl)-phenylester, 24.6 parts of 4-amino-1,1'-diphenylamino-2-sulphonic acid, 4 parts of magnesium oxide and 100 parts of dimethyl formamide is reacted for 7 hours at 100°. The mixture is allowed to cool and then run into a solution of 250 parts of ethanol and 200 parts of water. The dye is salted out with 20 parts of potassium chloride, filtered with suction, washed with a 10 % potassium chloride solution until the waste liquid runs clear, dried and ground. It is obtained as a brown powder which dissolves in water with a yellowish brown colour. On natural and synthetic polyamide fibres it gives dyeings and prints of high light and wet fastness.

EXHAUST DYEING PROCEDURE

A dyebath is prepared at 40° with 2 parts of the dye of Example 1 and 2 parts of 100 % acetic acid in 4000 parts of water. 100 Parts of a fabric of polyamide 6.6 filament yarn are entered into the bath, the temperature is increased to 100° in 30 minutes and the fabric dyed for 30 minutes at this temperature. Then the water lost by evaporation is replaced, 2 parts of 100 % acetic acid are added and dyeing continued for 30 minutes at the boil. The fabric is removed from the bath, rinsed with warm and then cold water and dried. A yellowish brown dyeing fast to light and wet treatments is obtained.

PAD DYEING PROCEDURE

A padding liquor is prepared with
1000 parts of water
5 parts of the dye of Example 1
80 parts of urea
20 parts of benzyl alcohol
1 part of ammonium sulphate
and 1 part of a highly viscous thickening agent on a galactomannonether basis A fabric of polyamide 6.6 filament yarn is padded with this liquor at 60°, expressed to retain 50 % of its weight of liquor, dried at 20° and fixed by steaming with saturated steam for 2 minutes 30 seconds at 2.1 atmospheres excess pressure. It is then rinsed with hot and cold water and dried. The fabric is dyed in a yellowish brown shade of good light and wet fastness.

EXAMPLE 2

A mixture of 45.6 parts of 1-chloro-2-nitrobenzene-4-sulphonic acid-(4'-iso-octyl)-phenylester, 24.6 parts of 4-amino-1,1'-diphenylamine-2-sulphonic acid, 4 parts of magnesium oxide and 100 parts of dimethyl formamide is reacted for 14 hours at 100°C. On cooling, the mixture is allowed to flow into a solution of 300 parts of ethanol and 100 parts of water. The dye is salted out with 5 parts of potassium chloride, washed with 10 % potassium chloride solution until the waste liquid runs colourless, dried and ground. It is obtained as a brown powder which dissolves in water with a yellowish brown colour. Dyeings and prints of this dye on natural and synthetic polyamide fibres have high fastness to light and wet treatments.

The following table specifies further dyes of formula (I) produced in accordance with this invention; they are distinguished by the meanings of $R_1$, $R_2$ and $R_3$ and by the shade of the dyeings on wool and synthetic polyamide fibres.

Table

| Expl. No. | $R_1$ | $R_2$ | $R_3$ | Shade |
|---|---|---|---|---|
| 3 | Phenyl | 2-sulpho-p-phenylene | 2,3-Tetramethylenephenyl | brown |
| 4 | do. | do. | 4-Chloro-3-methylphenyl | do. |
| 5 | do. | do. | 4-t-Butylphenyl | do. |
| 6 | do. | do. | 5-Norbornen-endo-2,3-dicarbonimidyl | do. |
| 7 | do. | do. | Naphthyl-1 | do. |
| 8 | do. | do. | Naphthyl-2 | do. |
| 9 | do. | do. | p-t-Amyl-phenyl | do. |
| 10 | do. | do. | Phenyl | do. |
| 11 | do. | do. | 2-Methylphenyl | do. |
| 12 | do. | do. | 4-Chlorophenyl | do. |
| 13 | do. | do. | 2,5-Dichlorophenyl | do. |
| 14 | do. | do. | 2,4,5-Trichlorophenyl | do. |
| 15 | do. | do. | 4-Sulphonaphthyl-1 | do. |
| 16 | 2-Sulpho-p-phenylene | 2-Methoxy-p-phenylene | 4-Cyclohexylphenyl | do. |
| 17 | do. | do. | 2,5-Dichlorophenyl | do. |
| 18 | do. | do. | 4-Chlorophenyl | do. |
| 19 | Naphthyl-1 | 2-Sulpho-p-phenylene | 4-Cyclohexylphenyl | do. |
| 20 | Phenyl | do. | p-iso-Octyl-phenyl | do. |
| 21 | 4-Chlorophenyl | 2-Sulpho-p-phenylene | Phenyl | do. |
| 22 | do. | do. | 2,5-Dichlorophenyl | do. |
| 23 | Phenyl | do. | p-n-Nonyl-phenyl | do. |
| 24 | do. | do. | n-Butylphenyl | do. |
| 25 | do. | do. | 2,4,6-Tribromophenyl | do. |
| 26 | Naphthyl-2 | do. | 2-Methylphenyl | do. |
| 27 | 4-Acetylaminophenyl | do. | do. | do. |
| 28 | do. | do. | 4-Chlorophenyl | do. |
| 29 | do. | do. | 2,5-Dichlorophenyl | do. |
| 30 | 2-Nitro-4-sulphophenyl | p-Phenylene | do. | do. |
| 31 | do. | do. | 4-Cyclohexylphenyl | do. |
| 32 | 3-Sulphophenyl | do. | 4-Chlorophenyl | do. |

Table-continued

| Expl. No. | R₁ | R₂ | R₃ | Shade |
|---|---|---|---|---|
| 33 | 4-Sulphonaphthyl-1 | do. | do. | do. |
| 34 | do. | do. | 2,5-Dichlorophenyl | do. |
| 35 | 4-Phenoxyphenyl | 2-Sulpho-p-phenylene | 2-Methylphenyl | do. |
| 36 | 4-(4'Chlorophenoxy)-phenyl | do. | do. | do. |
| 37 | 6-Sulphonaphthyl-1 | p-Phenylene | do. | do. |
| 38 | 2-Chloro-4-sulphophenyl | do. | 4-Chlorophenyl | do. |
| 39 | 4-Methyl-2-sulphophenyl | p-Phenylene | 4-Chlorophenyl | do. |
| 40 | 4-Methoxy-2-sulphophenyl | do. | do. | do. |
| 41 | 2-Nitro-4-sulphophenyl | do. | 4-Sulphonaphthyl-1 | do. |
| 42 | 4-Acetylaminophenyl | 2-Sulpho-p-phenylene | do. | do. |
| 43 | 4-Chlorophenyl | do. | do. | do. |
| 44 | do. | do. | 2,3-Tetramethylenephenyl | do. |
| 45 | 4-Acetylaminophenyl | do. | do. | do. |
| 46 | 4-Phenoxyphenyl | do. | do. | do. |
| 47 | 4-(4'-Chlorophenoxy)-phenyl | do. | do. | do. |
| 48 | 2-Nitro-4-sulphophenyl | p-Phenylene | do. | do. |
| 49 | 4-Methyl-2-sulphophenyl | do. | do. | do. |
| 50 | 2-Sulphophenyl | 2-Methoxy-p-phenylene | do. | do. |
| 51 | Phenyl | 2-Sulpho-p-phenylene | p-n-Dodecyl-phenyl | do. |
| 52 | do. | do. | Phenyl | do. |

Having thus disclosed the invention, what I claim is:

1. A water-soluble nitro compound of the formula

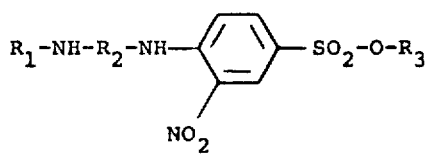

wherein

R₁ and R₃, independently, are substituted or unsubstituted and are phenyl or naphthyl;

R₂ is substituted or unsubstituted and is phenylene or naphthylene;

any substituent on R₁ or R₂ is alkyl of 1 to 5 carbon atoms, alkoxy of 1 or 2 carbon atoms, chloro, fluoro, bromo, nitro, cyano, trifluoromethyl, sulpho, phenoxy or chlorophenoxy;

and any substituent on R₃ is alkyl of 1 to 12 carbon atoms, alkoxy of 1 to 5 carbon atoms, fluoro, chloro, bromo, phenoxy, benzyloxy, cyclohexyloxy, phenyl, cyclohexyl, 2,3-tetramethylene, 3,4-tetramethylene, carboxy, sulpho, nitro, or cyano;

provided that R₁ and R₂ may contain up to two substituents and R₃ may contain up to three substituents selected from chloro and bromo or otherwise up to two substituents, said compound containing one or two sulpho groups, at least one of which is attached to the group R₁ or R₂.

2. A compound according to claim 1 wherein any substituent on R₁ or R₂ is alkyl of 1 to 5 carbon atoms, alkoxy of 1 or 2 carbon atoms, or sulpho, and any substituent on R₃ is alkyl of 1 to 12 carbon atoms, alkoxy of 1 to 5 carbon atoms, cyclohexyl or sulpho.

3. A compound according to claim 1 wherein

R₁ is phenyl, 2-sulphophenyl, naphthyl-1, 4-chlorophenyl, naphthyl-2, 2-nitro-4-sulphophenyl, 3-sulphophenyl, 4-sulphonaphthyl-1, 4-phenoxyphenyl, 4-(4'-chlorophenoxy)-phenyl, 6-sulphonaphthyl-1,2-chloro-4-sulphophenyl, 4-methyl-2-sulphophenyl or 4-methoxy-2-sulphophenyl, R₂ is 2-sulphophenylene, 2-methoxyphenylene or phenylene and R₃ is 4-cyclohexylphenyl, 4-iso-octylphenyl, 2,3-tetramethylenephenyl, 4-chloro-3-methylphenyl, 4-t-butylphenyl, naphthyl-1, naphthyl-2, 4-t-amylphenyl; phenyl, 2-methylphenyl, 4-chlorophenyl, 2,5-dichlorophenyl, 2,4,5-trichlorophenyl, 4-sulphonaphthyl-1, 2,5-dichlorophenyl, p-iso-octylphenyl, p-nonylphenyl, n-butylphenyl, 2,4,6-tribromophenyl or p-n-dodecylphenyl.

4. A compound according to claim 1 wherein each of R₁, R₂ and R₃ contains no more than a single sulpho group.

5. The compound of claim 1 wherein R₁ is phenyl, R₂ is 2-sulpho-p-phenylene, and R₃ is 4-isooctylphenyl.

6. The compound of claim 1 wherein R₁ is phenyl, R₂ is 2-sulpho-p-phenylene, and R₃ is 4-t-butylphenyl.

7. The compound of claim 1 wherein R₁ is phenyl, R₂ is 2-sulpho-p-phenylene, and R₃ is naphthyl-1.

8. The compound of claim 1 wherein R₁ is phenyl, R₂ is 2-sulpho-p-phenylene, and R₃ is naphthyl-2.

9. The compound of claim 1 wherein R₁ is 2-sulphophenyl, R₂ is 2-methoxy-p-phenylene, and R₃ is 4-cyclohexylphenyl.

10. The compound of claim 1 wherein R₁ is phenyl, R₂ is 2-sulpho-p-phenylene, and R₃ is p-n-nonylphenyl.

11. A water-soluble nitro compound according to claim 1 bearing, in its molecular structure, 1 or 2 sulpho groups and wherein R₁ is substituted or unsubstituted phenyl, and R₂ is a 2-sulphophenylene radical; which may be further substituted on the phenylene nucleus.

12. A compound according to claim 11 in which R₃ is an α- or β-naphthyl radical.

13. A compound according to claim 11 in which R₃ is a p-t-amyl-, p-iso-octyl-, p-n-nonyl- or p-n-dodecylphenyl radical.

14. A compound according to claim 11 in which R₃ is a phenyl radical.

15. A compound according to claim 11 in which R₁ is phenyl, R₂ is 2-sulpho-p-phenylene, and R₃ is 4-cyclohexylphenyl.

16. A compound of the formula

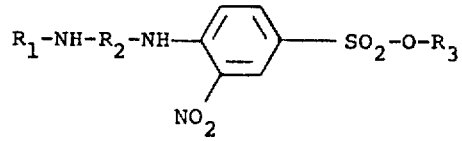

wherein
R$_1$ is phenyl; 2-, 3- or 4-sulpho-, -chloro-, -methoxy- or -ethoxyphenyl; 2-nitro-4-sulphophenyl; naphthyl-1; 4-phenoxyphenyl or 4-(4'-chlorophenoxy)-phenyl,
R$_2$ is phenylene; 2- or 3-sulphophenylene; 2-methoxyphenylene or 2-ethoxyphenylene, and
R$_3$ is phenyl; 2-, 3- or 4-methyl-, -ethyl-, -methoxy-, -ethoxy-, -bromo-, -chloro- or -fluorophenyl; 2,4- or 2,5-dichlorophenyl; 2,4,5- or 2,4,6-trichloro-, -tribromo or trimethylphenyl; 2,4-, 2,5-, 2,6- or 3,4-dimethyl- or -diethylphenyl; 2-ethyl-4,6-dimethylphenyl; 2,4-diethyl-6-methylphenyl; 4-isopropyl-, -n-butyl-, -t-butyl-, -t-amyl-, -t-octyl-, -isooctyl-, -nonyl-, -dodecyl-, -butoxy-, -n-amyloxy-, -phenoxy-, -benzyloxy-, cyclohexyloxy-, -phenyl- or cyclohexylphenyl; 2,3- or 3,4-tetramethylenephenyl; 2-isopropyl-5-methylphenyl; 2-methyl-5-isopropylphenyl; 2-, 3- or 4-carboxyphenyl; 2-, 3- or 4-sulphophenyl; 3- or 4-nitro- or -cyanophenyl; naphthyl-1 or -2; 4-, 5-, 6- or 7-sulphonaphthyl; or 4 or 6-sulphonaphthyl-2.

* * * * *